US010636000B2

(12) United States Patent
Dunne et al.

(10) Patent No.: US 10,636,000 B2
(45) Date of Patent: Apr. 28, 2020

(54) ASCERTAINING THE ENGAGEMENT ABILITY OF A USER IN AN ONLINE ENVIRONMENT

(71) Applicant: International Business Machines Corporation, Armonk, NY (US)

(72) Inventors: Jonathan Dunne, Dungarvan (IE); Andrew Penrose, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/712,139

(22) Filed: Sep. 22, 2017

(65) Prior Publication Data

US 2019/0095844 A1 Mar. 28, 2019

(51) Int. Cl.
*G06Q 10/06* (2012.01)
*H04L 12/58* (2006.01)
*G06F 9/451* (2018.01)

(52) U.S. Cl.
CPC ..... *G06Q 10/063112* (2013.01); *G06F 9/453* (2018.02); *G06Q 10/06398* (2013.01); *H04L 51/04* (2013.01); *H04L 51/046* (2013.01)

(58) Field of Classification Search
None
See application file for complete search history.

(56) References Cited

U.S. PATENT DOCUMENTS

| 6,346,952 | B1 * | 2/2002 | Shtivelman | ........... | G06F 17/277 |
| | | | | | 715/758 |
| 6,727,916 | B1 | 4/2004 | Ballard | | |
| 7,237,011 | B1 * | 6/2007 | St. Pierre | ................ | H04L 51/26 |
| | | | | | 709/203 |
| 8,972,868 | B2 | 3/2015 | Schubert | | |
| 2002/0059164 | A1 * | 5/2002 | Shtivelman | ......... | H04L 12/1831 |
| 2006/0004911 | A1 | 1/2006 | Becker et al. | | |
| 2006/0229896 | A1 * | 10/2006 | Rosen | ................ | G06Q 10/10 |
| | | | | | 705/321 |
| 2009/0222551 | A1 * | 9/2009 | Neely | ................. | G06F 16/951 |
| | | | | | 709/224 |
| 2010/0293560 | A1 * | 11/2010 | Bland | ................ | H04L 51/02 |
| | | | | | 719/328 |

(Continued)

FOREIGN PATENT DOCUMENTS

CN 103401712 A 11/2013

OTHER PUBLICATIONS

O'Malley et al., "Automatic Patch Management," U.S. Appl. No. 15/472,695, filed Mar. 29, 2017, 45 pages.

*Primary Examiner* — Brian Whipple
(74) *Attorney, Agent, or Firm* — Yee & Associates, P.C.

(57) ABSTRACT

The illustrative embodiments provide for a computer-implemented method of allocating, in real time, actions to individuals based on text monitored in chat channels executing on different computers in a computer network. A desired action mentioned in the chat session is detected. Action to vector modeling is then performed by assigning a corresponding coefficient for the action to ones of a plurality of different vectors for ones of a plurality of different users. A corresponding set of coefficients is combined for all users. A highest coefficient is selected, corresponding to a second user from among the ones of the plurality of different users. A message is sent to the second user requesting the second user to perform the action.

20 Claims, 7 Drawing Sheets

(56) References Cited

U.S. PATENT DOCUMENTS

2013/0282417 A1* 10/2013 Gaedcke .............. G06Q 30/016
                                                                705/7.13
2014/0136939 A1*  5/2014 Chan .................... G06F 17/246
                                                                715/227
2016/0277574 A1    9/2016 Ristock et al.

* cited by examiner

ACTION TO VECTOR MODELLING

| ACTION A | SKILLS | ENG. ABILITY | DEVICE | LOCATION | ENVIRONMENT |
|---|---|---|---|---|---|
| CAN SOMEONE SHARE THIS DOCUMENT WITH ME? | -"SHARE DOCUMENT" ACTION -DOCUMENT ACCESS | -PREVIOUSLY SHARED THIS DOCUMENT | -"SHARE" ACTION ABILITY ON ANY DEVICE | -STATIONARY -ON THE GO | -CAN BE IN A MEETING OR ON THE PHONE |
| THE CHAT NODE IS DOWN. CAN IT BE RESTARTED IN THE EU DATA CENTER? | -"RESTART SERVICE" ACTION | -PREVIOUSLY RESTARTED SERVICES | -"RESTART SERVICE" BEST DONE ON DESKTOP | -STATIONARY TO ENSURE FOLLOW UP ON ISSUES IS POSSIBLE | -NOT ON PHONE OR IN MEETING |

300 → ACTION A; 302, 304 (within first action row); 308 → SKILLS; 310 → ENG. ABILITY; 306 → spans DEVICE / LOCATION / ENVIRONMENT

FIG. 3

ASCERTAINING THE ENGAGEMENT ABILITY OF A USER IN AN ONLINE ENVIRONMENT

CROSS REFERENCE TO RELATED PATENT APPLICATIONS

The present application is related to application "Automatic Patch Management," Ser. No. 15/472,695, filed on Mar. 29, 2017, which is assigned to the same assignee and incorporated herein by reference.

BACKGROUND INFORMATION

1. Field

The present disclosure relates to methods and devices for ascertaining the engagement ability of a user in an online environment and to request an activity be performed by another user based on chat messaging.

2. Background

Chat channels are an online communication forum. Typically, a chat channel is an instant messaging system where a user can type or otherwise input a message into a chat window, and when submitted, the message is transmitted to multiple users of a given chat channel.

Chat technology, or instant messaging technology, has been used for online support. For example, a user could go to a website and be invited to chat with a customer service representative who will address that user's needs. This example is a private, one-on-one communications system between the user and the customer service representative.

However, in a chat channel, typically there are many users participating, not all of whom are available, and most of whom are likely not optimally suited to handle a given task. Thus, if one user asks for help via the chat channel, or desires to assign a task to another user, then an undesirable amount of time may be used to find the desired help or to find a suitable person to whom to assign the task. Even then, the task assignment may still be sub-optimal.

SUMMARY

The illustrative embodiments provide for a computer-implemented method of allocating, in real time, actions to individuals based on text monitored in chat channels executing on different computers in a computer network. The computer-implemented method includes parsing, using a processor, the text in a first chat channel into one or more keywords. The computer-implemented method also includes determining, using the processor and using the one or more keywords, an action desired to be performed by a first user of the first chat channel. The computer-implemented method also includes performing, by the processor, action to vector modeling. Action to vector modeling includes assigning a corresponding coefficient for the action to ones of a plurality of different vectors for ones of a plurality of different users. Ones of the plurality of different vectors are parameters that affect an ability and an availability of another user to perform the action. Thus, ones of the plurality of different users have assigned a particular coefficient for ones of the plurality of vectors, and the ones of the plurality of different users have a corresponding set of coefficients for the ones of the plurality of different vectors. The computer-implemented method also includes combining, by the processor, for the ones of the plurality of different users, the corresponding set of coefficients. Thus, a corresponding single action engagement coefficient is calculated for the ones of the plurality of different users, and a set of action engagement coefficients is calculated. The computer-implemented method also includes selecting, by the processor, a highest coefficient corresponding to a second user from among the ones of the plurality of different users. The computer-implemented method also includes transmitting a message to the second user requesting the second user to perform the action.

The illustrative embodiments also contemplate a computer which has a non-transitory computer-readable storage medium containing program code, which when executed by a processor of the computer, implements the above computer-implemented method. The illustrative embodiments also contemplate a non-transitory computer-readable storage medium containing program code, which when executed by a processor, implements the above computer-implemented method. Other variations are possible, as described below.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 illustrates a block diagram of an example of action to vector modeling, in accordance with an illustrative embodiment;

DETAILED DESCRIPTION

Figure 1:
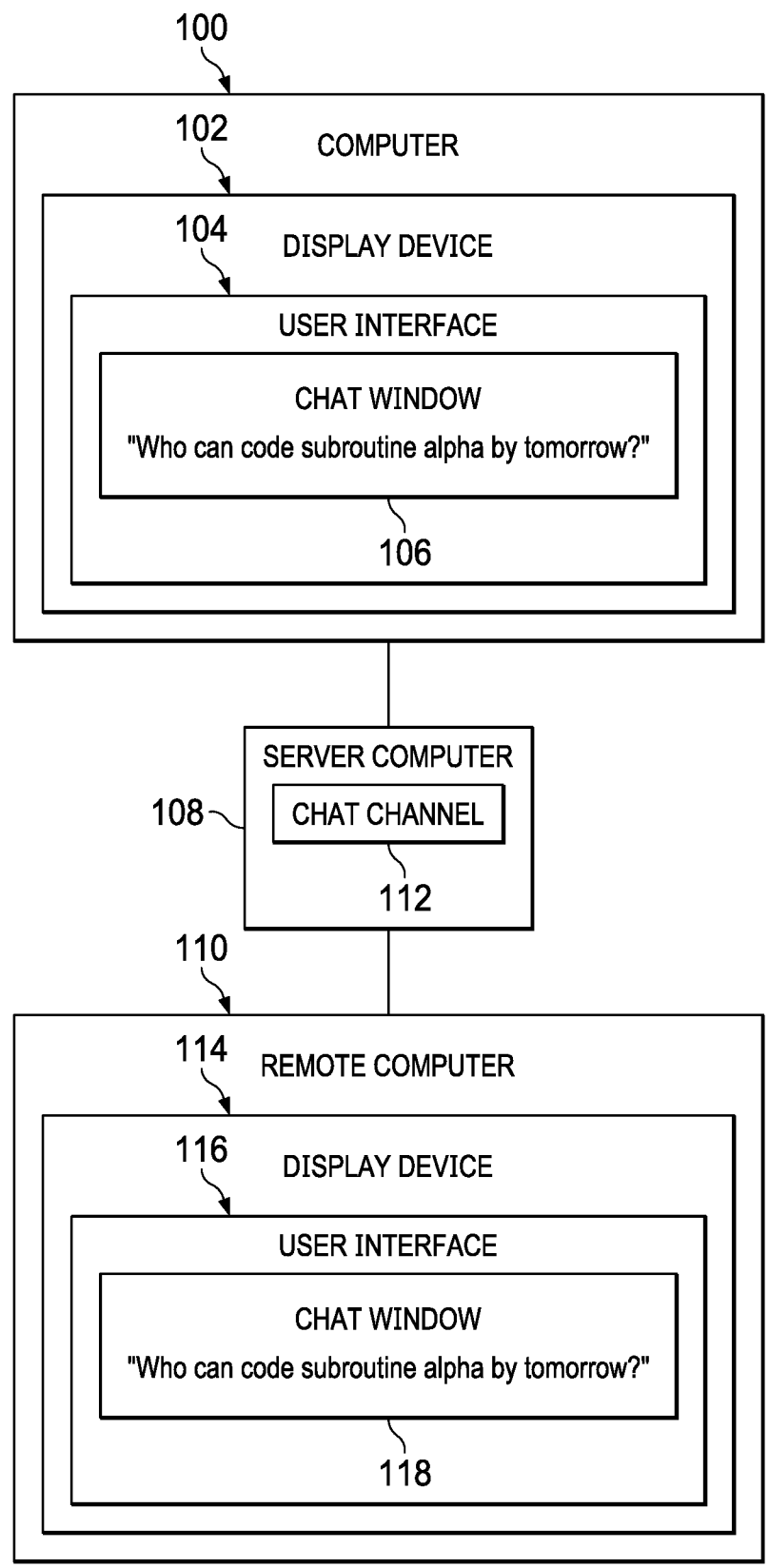
FIG. 1 illustrates a chat channel, in accordance with an illustrative embodiment.

The illustrative embodiments provide for a novel method to select a most suitable candidate to perform a task that is identified within a group chat. Given an identified task and a set of associated criterion necessary for that task, and a set of detected or known criterion of the participants; a prioritized list of possible candidates is derived. Having autonomically chosen and suggested candidates, human feedback as to the accuracy of the suggestion is garnered and used to improve subsequent suggestions in the future.

The illustrative embodiments recognize and take into account that, in current group chat channel applications, chat channels are typically created based on a broad topic or function. One specific function could be related to remediating customer issues, while another could be related to deployment tasks.

The illustrative embodiments also recognize and take into account that, with newly developed cognitive applications analysis and tooling, text to surface specific actions can be analyzed based on chat conversations within a specific channel. For example, a conversation in a chat channel may center on the desire to complete a technical document, make a configuration change to a system, or to deploy a new piece of code to a production pipeline system. In this example, a broad action may be defined, and further conversations are then centered around picking the best person to complete the task based on availability and skill set.

The illustrative embodiments also recognize and take into account that one of the problems with existing solutions is the need to manually identify an individual based on multiple factors, including but not limited to skills, engagement ability, and availability. However, there may be additional factors that need to be understood to determine if an individual can complete a task as efficiently as possible. For example, a determination may need to be made if a person working on a mobile device can complete the task with the same efficiency compared to another individual working with a traditional desktop or mobile system, relative to yet another individual who is working at a remote location. For example, these individuals may have differing access or role permissions via a virtual private network (VPN) connection as they would when connected directly to the corporate wide area network (WAN).

Thus, one purpose of the illustrative embodiments is to address these issues mentioned above and to deliver a cognitive approach to ensure tasks assigned based on channel conversations are completed in an expedited manner. The illustrative embodiments specifically recognize and take into account that action to vector modeling can be used to generate a series of availability coefficients for multiple users of a chat channel, and then assign a task to the user that has a highest availability coefficient.

The illustrative embodiments recognize and take into account several improvements over existing chat channel technologies. For example, the illustrative embodiments use a skills matrix and then, for actions derived from real-time chat, a determination is made whether a user has the ability to complete a task based on a prior probabilistic determination. Then, the illustrative embodiments may employ a learning module which can infer with precision a probabilistic determination of whether an individual can complete a given task. The illustrative embodiments also may utilize a feedback system that provides an additional supervised learning input. The illustrative embodiments also complement existing chat channel technology in relation to action identification, and provides a solution for action assignment and fulfillment.

Thus, the illustrative embodiments provide for the ability to allocate in real-time actions to individuals mentioned in chat channels who are most likely to complete it based on their ability and expert knowledge within the system about their skills and other attributes, such as work location and devices used. The illustrative embodiments also provide for a growing source of mappings built up to provide details on an individual's ability to perform an action based on multiple vectors. In this case the vectors may be skills, engagement ability, location, device and environment.

The illustrative embodiments also provide for defining each action to have a set of allowable vectors with which that action can be successfully performed. Each action that is identified in a chat is broken down into the discrete vector coefficients that are used by the allocation engine. Each of the vector coefficients are then used to provide an overall action engagement coefficient, which in turn determines which user is requested to perform a task.

The illustrative embodiments also provide that the engagement processor derives from the modelled action to vector model (AVM), a set of potential individuals that could perform this action. In turn, there may be a "human in the loop" or an automated mechanism to provide feedback to allow for the system to correct the allocation of the action based not on only the individuals chosen, but those placed in a position that could also have taken that action. Thus, one element of the action allocation may be the ability to have a feedback loop in place, whether that is a "human in the loop" or an automated mechanism to provide feedback.

The illustrative embodiments recognize and take into account that only a computer can handle these issues, and the illustrative embodiments provide a technical effect of enabling a computer to handle these issues. For example, the illustrative embodiments recognize and take into account that, across different skill style vectors, a decision needs to be made as to whether someone has the ability to complete a task. A human may not have the background knowledge to make the calculations. Only a computer can analyze multiple vectors and recurring layering, as human memory is not stable or capable of retaining the vast amount of information processed by the illustrative embodiments.

The illustrative embodiments also provide for several technical effects. For example, the illustrative embodiments provide a computer the ability to complete tasks that previously only a human could do; namely, assign tasks in real time to the most available user according to wide-ranging and disparate criteria. This ability is computer-centric and network-centric because it solves the problem of how to program a computer to receive chat data detected within a computer network and then make this assignment.

The illustrative embodiments also provide for another technical effect in that the illustrative embodiments present a visual façade which allows a human user to provide feedback to the computer to improve the selection of criteria for selecting the best available user to handle a task. In this manner, the illustrative embodiments provide for a computer interface which improves the ease of use of a computer for its intended purpose.

The illustrative embodiments also provide for corrective allocation of tasks in a manner which is invisible to users. For example, the illustrative embodiments provide for checking for other users' completion of prior tasks and then correcting allocation of new, similar tasks accordingly. Thus, the illustrative embodiments again provide for another computer-centric solution to the computer-centric problem of assigning tasks to individuals based on data automatically input from chat channels.

The illustrative embodiments are not limited to these examples. Other examples are provided below. Therefore, the claimed inventions are not necessarily limited by the examples provided above.

FIG. 1 illustrates a chat channel, in accordance with an illustrative embodiment. FIG. 1 shows computer 100 having display device 102 displaying user interface 104. User interface displays chat window 106. Chat window 106 is the user input area for a chat program executing on computer 100. When a user desires to send an instant message to other users in a chat channel, the user enters a text message, possibly with pictures or other files, using chat window 106.

Computer 100 is operating in a network environment, which may include server computer 108, and which includes remote computer 110. Server computer 108 may be responsible for maintaining chat channel 112, though, it is possible that chat communication happens directly between computer 100 and remote computer 110.

When a first user of computer 100 enters text or files into chat window 106, and assuming a second user of remote computer 110 is in the same chat channel, then remote computer 110 receives and displays the message on display device 114 of user interface 116 in chat window 118. In this manner, communication is facilitated between the first user and the second user.

The illustrative embodiments provide additional functionality to this communication scheme. However, while the illustrative embodiments could operate with as few as two users in a network environment, in realistic operating conditions there are many users, perhaps tens, hundreds, or even thousands of users, who are participating in a given chat channel. Communications in that chat channel are displayed on all computers of all users participating in the chat channel.

A problem arises in this context; namely, a given user may need help or may need to assign a task to another user in the chat channel. However, the given user typically does not know who is available, and more importantly, who is most available and most qualified. The illustrative embodiments solve this computer-centric issue by analyzing chat activity in the chat channel, determining which user is the most qualified and most available in real time, and then transmitting an automatic message to that most qualified and most available user requesting that person to perform the task.

Figure 2:
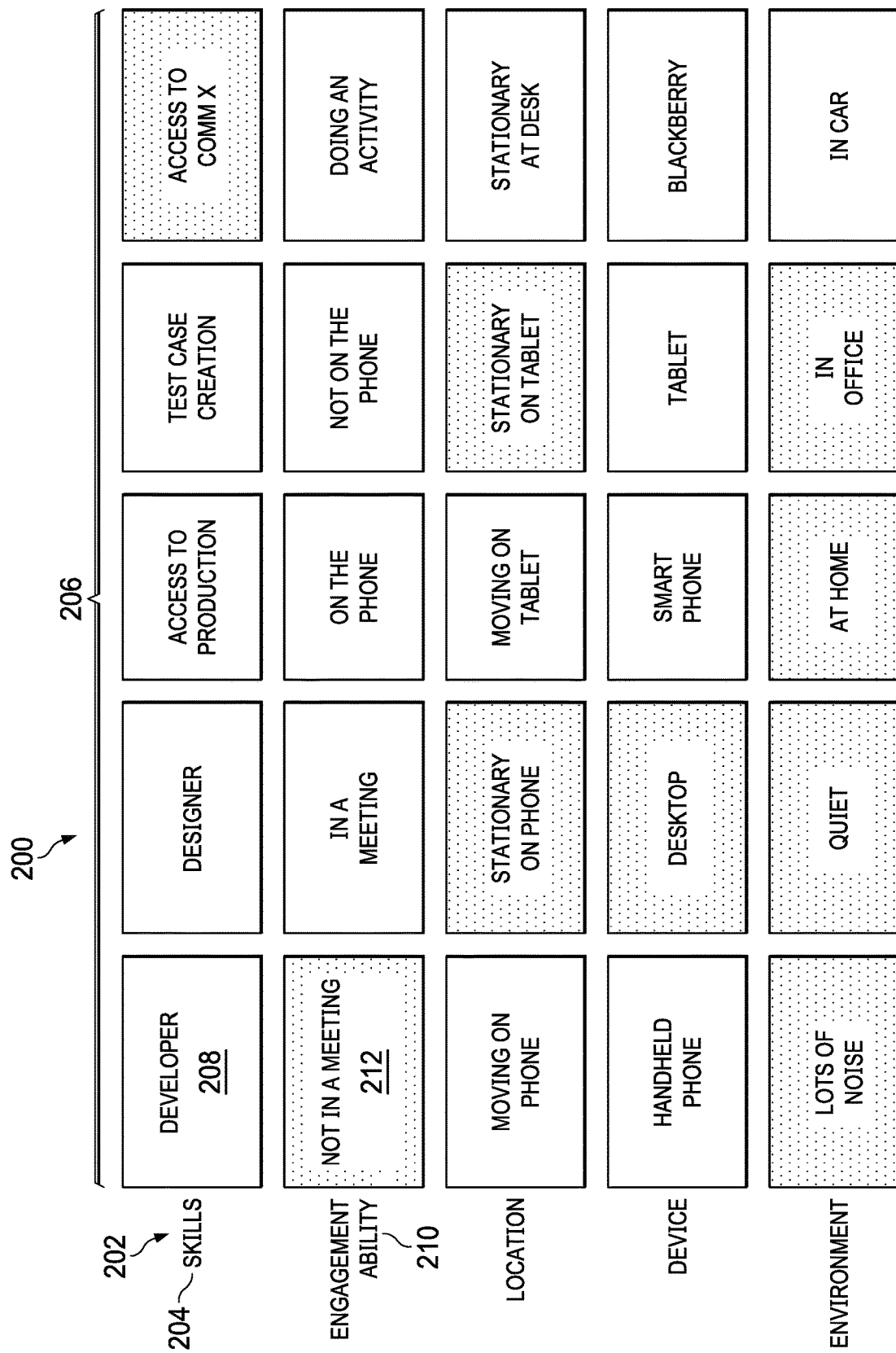
FIG. 2 illustrates a block diagram of an example of vectors useable for action to vector modeling, in accordance with an illustrative embodiment.

FIG. 2 illustrates a block diagram of an example of vectors useable for action to vector modeling, in accordance with an illustrative embodiment. Vectors 200 shown in FIG. 2 are used to evaluate which user is most available and most qualified to perform a task, as described above with respect to FIG. 1.

Vectors 200 are arranged into categories 202. Each vector may be considered a category. An example of categories 202 is skills category 204. Each of categories 202 has a number of specific instances 206 of categories 202. For example, skills category 204 has five different specific instances representing different skills. An example of a specific instance of skills category 204 is developer 208. Another example of a skills category and specific instance would be engagement ability category 210 and specific instance 212 within that category; namely "not in a meeting." Thus, it is assumed that a particular user who is a developer that is currently not in a meeting is associated with developer 208 within skills category 204 and with specific instance 212 within engagement ability category 210.

Many more categories and specific instances are possible than those shown. However, users within a chat channel are evaluated according to these categories and specific instances. In one illustrative embodiment, users are assigned a score between zero and one for each specific instance within each category. However, in some illustrative embodiments, a given category or specific instance may be ignored for one or more users. Additionally, different scoring schemes are possible, such as using different number ranges, or even alphanumeric codes.

In use, a first user enters in text into a chat channel, as described further below. The computer, typically a server computer, analyzed the text for requested actions. For example, the first user might enter into the chat channel "who can code subroutine alpha by tomorrow?" See, for example, chat window 106 in FIG. 1.

The computer first determines that the action is to generate code for a program. The computer uses a mathematical algorithm to combine the vector scores for each user to generate an overall availability score for each user in the chat channel. More details on this algorithm are disclosed below. The computer, then selects a highest availability score, which again is a combination of factors such as skill and availability, and possibly other factors. The highest availability score corresponds to a user who may be referred to as a chosen user. The computer will then send a message to the chosen user in the chat channel and ask that chosen user to generate computer code for subroutine alpha. The chosen user then transmits an acceptance or a refusal to perform this task. If refused, the computer may select a next most available user to perform the task.

Vectors 200 may take the form of a data structure, such as a table, that is continuously updated by the computer. Based on received chat information, possible other sources of information (such as a user's indication of availability or new skills), and desired actions mentioned in the chat channel, availability scores can be generated in real time, continuously. This activity may take place in a manner transparent to all users.

However, the illustrative embodiments contemplate another implementation in which vectors 200 are displayed for one or more users. For example, a manager may view a display of a table such as that shown in FIG. 2 for vectors 200. In this case, the user may select individual cells in the table in order to emphasize certain categories and/or certain specific instances. For example, specific instance 212 is highlighted by receiving user input from the manager.

Highlighted categories or specific instances may be given more weight in the algorithm described below. For example, when specific instance 212 is highlighted, the manager is expressing a stronger preference for selecting chosen users who are not in a meeting. Accordingly, certain skills, availability statuses, or other factors may be given more or less weight by the computer when evaluating the overall availability score for specific users.

Thus, the illustrative embodiments describe a method to assess the engagement ability of a user in a group chat to a particular action and suggest that person to act on upon it. In addition, the illustrative embodiments describe a feedback loop to allow the model to learn from responses garnered from those with the ability to provide useful comment.

The illustrative embodiments also provide for a growing source of mapping that is built up to provide details on individual's ability to perform an action based on multiple vectors. In the specific illustrative embodiments shown in FIG. 2, the vectors are skills, engagement ability, location, device, and environment. However, many other variations are possible.

FIG. 3 illustrates a block diagram of an example of action to vector modeling, in accordance with an illustrative embodiment. Action to vector modeling refers to the process of the computer, typically a server computer, mapping a received action, such as described with respect to FIG. 1, to one or more vectors, such as described with respect to FIG. 2. Thus, for example, each action shown in actions 300 may have been detected as desired actions to be assigned based on messages received in a chat window, such as chat window 106 of FIG. 1.

In an illustrative embodiment, a detected chat text may be shown in area 302. The text in area 302 is "can someone share this document with me?" The verb "share" and the subject "document" are highlighted in bold to indicate the action to be performed and the thing upon which the action is to be performed. In another example, the text in area 304 is "The chat node is down. Can it be restarted in the eu data center?" The noun "node" and the verb "be restarted" are highlighted as the verb and the subject to indicate the action to be performed and the thing upon which the action is to be performed.

The computer, which may be server computer 108 in FIG. 1, then models actions 300 to vectors 306. Vectors 306 may be vectors 200 in FIG. 2. Note, however, that in FIG. 3 the vector categories are displayed, as opposed to being displayed as columns in FIG. 2.

Each action is compared to the vectors. For example, certain skills are needed to share a document, someone needs to be available to share the document, someone should have access to a device to share the document, and someone might need to be in the correct location and the correct environment to share the document. A person who has previously shared a document may be given a high score under "engagement ability" vector 310. A person with document access and is known to be able to share a document may be given a high score under "skills" vector 308. Similarly, scores are generated for each of the other vectors shown in FIG. 3.

A set of scores is generated for some or all of the users in the chat channel. Each of these sets is combined accordingly such that all relevant users receive an overall score. The computer selects the user that has the highest overall score to receive a message requesting that the user performs the desired action. Note that a user may remove himself or herself from consideration from a particular action by setting his or her availability or skill or some other vector to zero for the particular action, thereby making that user's score zero for the particular action.

After the computer generates scores for each of these vectors, the computer generates an overall availability score by combining the scores according to an algorithm. An example of such an algorithm may be to assign scores between zero and one and then to multiply all scores together to achieve an overall score. Scores may be weighted before multiplication. Another example of such an algorithm is described with respect to FIG. 4.

A similar process may be performed for the text shown in area 304. For example, in order to restart a node, a qualified user should have the proper skills, preferably, having previously started a node before, having access to the proper equipment in the proper location, and otherwise be available. An availability score is generated for some or all of the users in the chat channel for each of the vectors. An overall, or combined, score is generated from the set of individual scores for each user in the chat channel. The user with the highest overall score receives a message in the chat channel requesting that that user perform the desired action of restarting the node.

Figure 4:
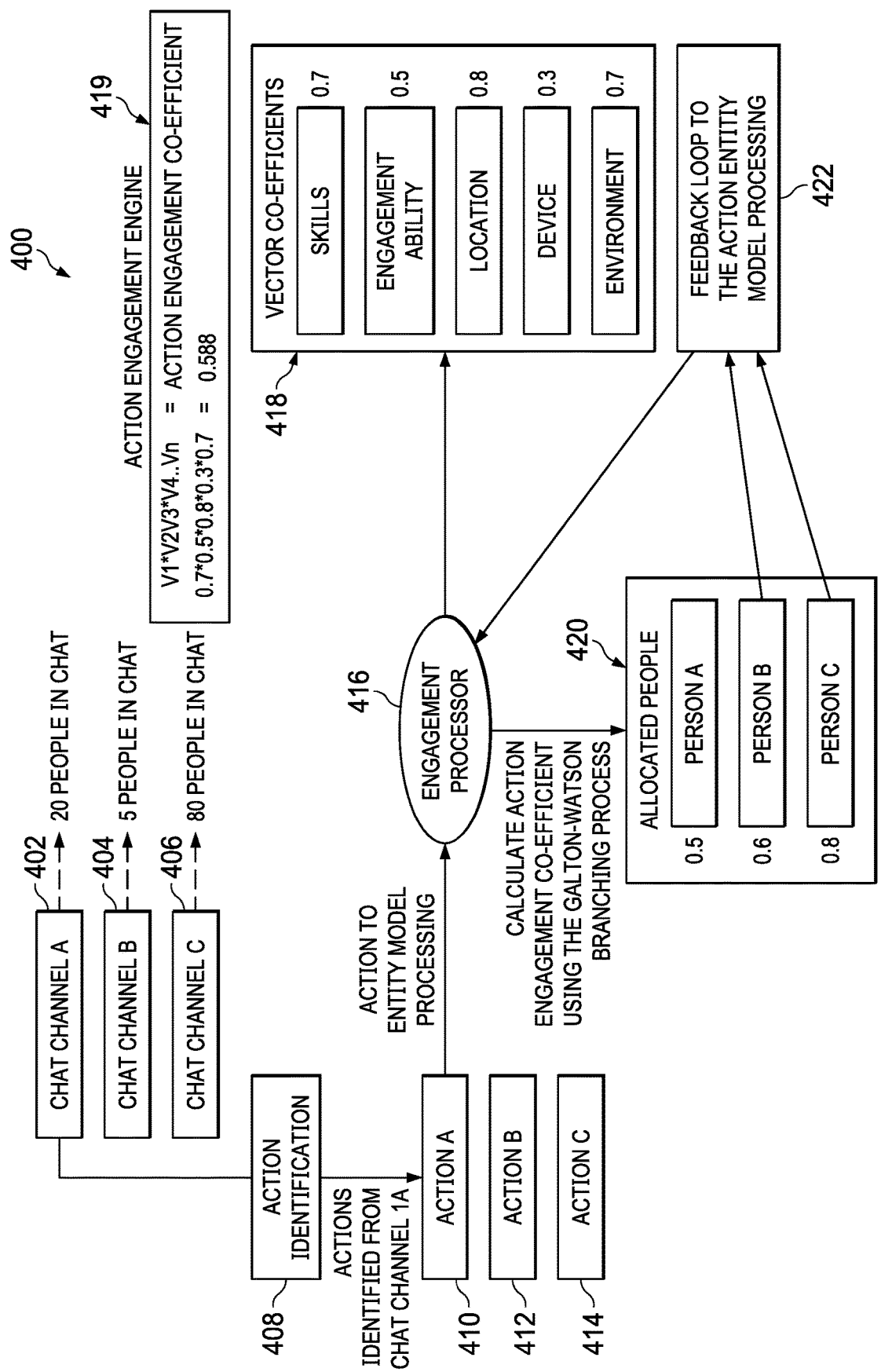
FIG. 4 illustrates an example of an action engagement engine, in accordance with an illustrative embodiment.

FIG. 4 illustrates an example of an action engagement engine, in accordance with an illustrative embodiment. Action engagement engine 400 may be used to implement a chat assignment system, such as those described above with respect to FIG. 1 through FIG. 3. Action engagement engine 400 may be a computer, such as server computer 108 of FIG. 1 or data processing system 700 of FIG. 7.

Action engagement engine 400 monitors one or more chat channels, such as but not limited to chat channel A 402, chat channel B 404, and chat channel C 406. As indicated in FIG. 4, these chat channels may have differing numbers of users. Action engagement engine 400 then performs action identification 408 in real time, as described above with respect to FIG. 3. Action identification may be performed separately for each chat channel. However, in some illustrative embodiments, multiple chat channels may be monitored simultaneously such that users in different chat channels may be requested to perform activities from other chat channels.

In the illustrative embodiment shown in FIG. 4, action identification 408 is performed only for chat channel A 402. In this illustrative embodiment, action engagement engine 400 identifies three actions: Action A 410, Action B 412, and Action C 414. Engagement processor 416, which may be the same or different processor executing action engagement engine 400, then determines vector coefficients for some or all of the users in chat channel A 402 for some or all of the vector coefficients being used by action engagement engine 400. In this illustrative embodiment, all users in chat channel A 402 receive a score for every instance of each vector.

Thus, for example, area 418 shows vector coefficients for a single user of a chat channel among each of the five different vector coefficients shown in FIG. 2 and FIG. 3. A number between zero and one is assigned to each vector. Engagement processor 416 then calculates an action engagement coefficient 419 from the vector coefficients shown in area 418. This calculation can be made as described above, or by using the Galton-Watson branching process. The user with the highest overall engagement coefficient is allocated the task at hand by sending that user a message requesting the action be performed. In this illustrative embodiment, person C in area 420 will be assigned the task because person C has the highest overall coefficient.

In an illustrative embodiment, feedback 422 may be added to the real time processing loop in order to improve the action engagement engine and to account for changing conditions over time, such as when users come on-shift or go off-shift.

Stated differently, each action that is identified in a chat is broken down into the discrete vector coefficients that are used by action engagement engine 400. Each of the vector coefficients are then used to provide an overall action engagement coefficient.

In a specific example, Action A 410 requires a skills co-efficient of 0.7 relating to specific skills for that action. This example requires Skill A, D, and F (not shown). Skill A has a coefficient of 0.2; Skill D has a coefficient of 0.3; and Skill F has a coefficient of 0.25. Person A (not shown) has skills A and D that are required to perform the action. For this example, the skill coefficient of Person A is (skill A+skill D)/skill count.

Action results can be based on individual actions. Action results can be based on a person's comment, a result, an automated check of a result from an action, such as the successful closing of a project, the closing of a defect, and others.

Action engagement engine 400 derives from the modelled action to vector model (AVM), a set of potential individuals that could perform this action. In turn, there is either a "human in the loop" or an automated mechanism to provide feedback to allow for the system to correct the allocation of the action based not only on individuals chosen, but those placed in a position that could also have taken that action.

The identification of the vector coefficients using action engagement engine 400 allows for the allocation of people to a task. This ability is useful in itself; however, in addition the introduction of a feedback loop that refines the engagement processor results.

An example of this feedback is shown when calculating the skill coefficient of Person A for an action: Person A skill coefficient=(skill A+skill D)/skill count+previous action coefficient for Person A+Feedback co-efficient based on Action Results. Other formulae may be used.

The illustrative embodiments described with respect to FIG. 4 are only examples. Additional examples are possible. Thus, the illustrative embodiments described with respect to FIG. 4 do not necessarily limit the claimed inventions.

Figure 5:
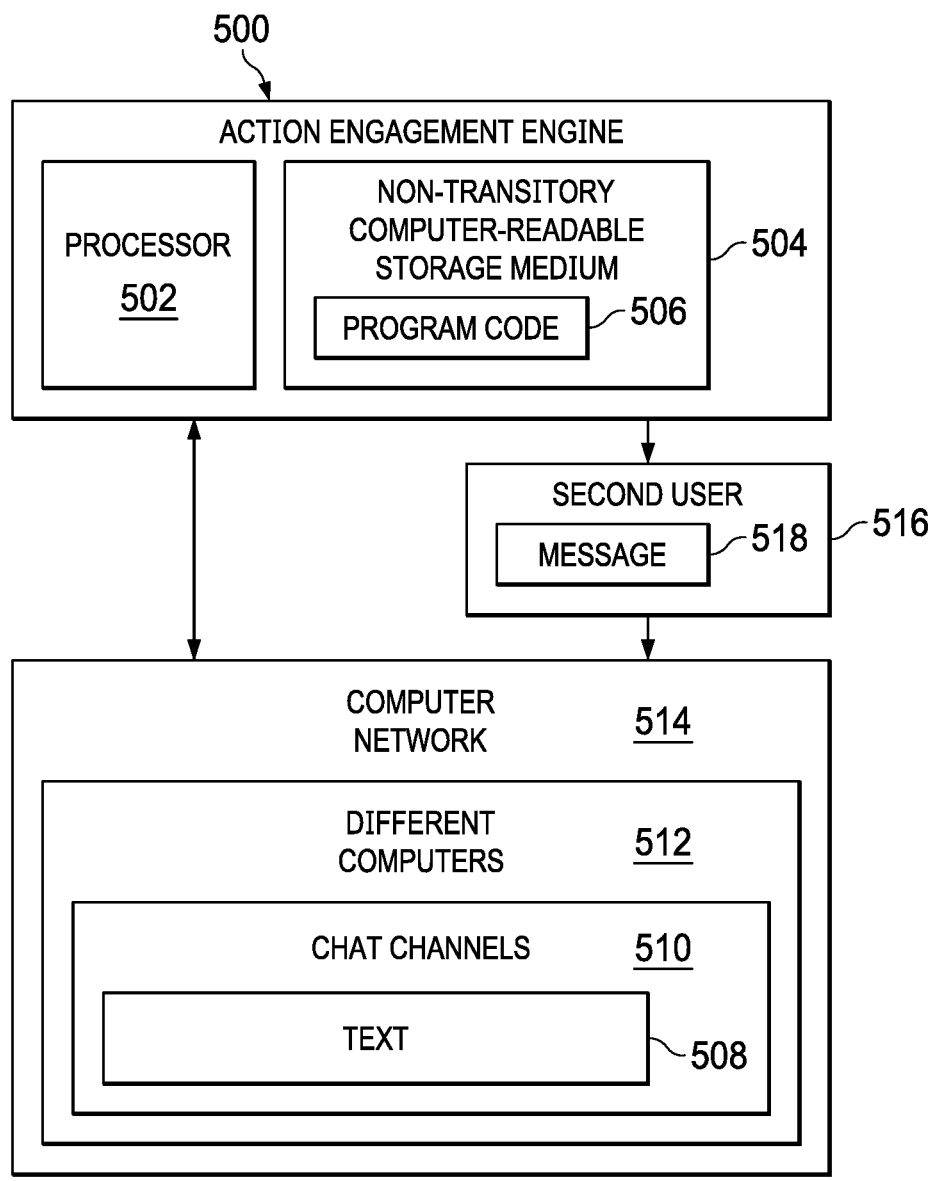
FIG. 5 illustrates a block diagram of another action engagement engine, in accordance with an illustrative embodiment.

FIG. 5 illustrates a block diagram of another action engagement engine, in accordance with an illustrative embodiment. Action engagement engine 500 may be a variation of action engagement engine 400 of FIG. 4, and may be an example of server computer 108 of FIG. 1 or data processing system 700 of FIG. 7.

Action engagement engine 500 may be a computer. The computer includes processor 502 and non-transitory computer-readable storage medium 504. Non-transitory computer-readable storage medium 504 stores program code 506, which when executed by processor 502, performs a computer-implemented method of allocating, in real time, actions to individuals based on text 508 monitored in chat channels 510 executing on different computers 512 in computer network 514.

The program code for implementing the computer-implemented method includes computer-usable program code for parsing, using a processor, text in a first chat channel into one or more keywords. The program code also includes computer-usable program code for determining, using the processor and using the one or more keywords, an action desired to be performed by a first user of the chat channel.

The program code also includes computer-usable program code for performing, by the processor, action to vector modeling. Action to vector modeling comprises assigning a corresponding coefficient for the action to ones of a plurality of different vectors for ones of a plurality of different users. Ones of the plurality of different vectors are parameters that affect an ability and an availability of another user to perform the action. In this manner, ones of the plurality of different users have assigned a particular coefficient for ones of the plurality of vectors. Additionally, the ones of the plurality of different users have a corresponding set of coefficients for the ones of the plurality of different vectors.

The program code also includes computer-usable program code for combining, by the processor, for the ones of the plurality of different users, the corresponding set of coefficients. In this manner, a corresponding single action engagement coefficient is calculated for the ones of the plurality of different users. A set of action engagement coefficients is calculated.

The program code also includes computer-usable program code for selecting, by the processor, a highest coefficient corresponding to second user 516 from among the ones of the plurality of different users. The program code also includes computer-usable program code for transmitting message 518 to second user 516 requesting the second user to perform the action.

Variations to action engagement engine 500 are possible. For example, in an illustrative embodiment, combining may include multiplying the corresponding set of coefficients for the ones of the plurality of users. In another illustrative embodiment, the plurality of different vectors include a skill category, a history of performing the action, a capability of performing the action, a proximate location for performing the action, and an environment in which a given user is involved.

In still another illustrative embodiment, the computer-usable program code for performing action to vector modeling further includes computer-usable program code for weighting a first coefficient for a first vector more than a second coefficient for a second vector. In still another illustrative embodiment, the computer-usable program code further includes: computer-usable program code for displaying the plurality of vectors; computer-usable program code for displaying sub-entries for each of the plurality of vectors, wherein the plurality of vectors and the sub-entries are displayed as a table of cells; and computer-usable program code for as part of performing action to vector modeling, selecting cells in the plurality of cells and assigning additional weighting to those vectors and sub-entries.

In yet another illustrative embodiment, the computer-usable program code further includes computer-usable program code for receiving by the processor feedback from a feedback mechanism; and computer-usable program code for revising, by the processor, the set of action engagement coefficients such that a revised highest coefficient is selected from a revised set of action engagement coefficients, and wherein either (a) the message is sent to the second user based on the revised highest coefficient or (b) a revised message based on the revised highest coefficient is sent to a third user requesting the third user to perform the action.

In still another illustrative embodiment, the computer-usable program code for receiving feedback is one of: computer-usable program code for receiving the feedback from the second user, and wherein the feedback includes at least one of an additional vector relevant to the second user, a modification to an existing vector, or an indication of non-availability which sets an availability of the second user to zero; and computer-usable program code for automatically receiving additional information from client computers belonging to the plurality of different users, and updating the highest coefficient in real time prior to the second user accepting assignment of the action.

In a still further illustrative embodiment, the message is a first message and the revised message is sent to the third user. In this case, the computer-usable program code further includes computer-usable program code for sending a new message to the second user requesting that the second user ignore the first message.

Other variations are possible. More or fewer features are possible for action engagement engine 500. Thus, the examples shown with respect to FIG. 5 do not necessarily limit the claimed inventions.

Figure 6:
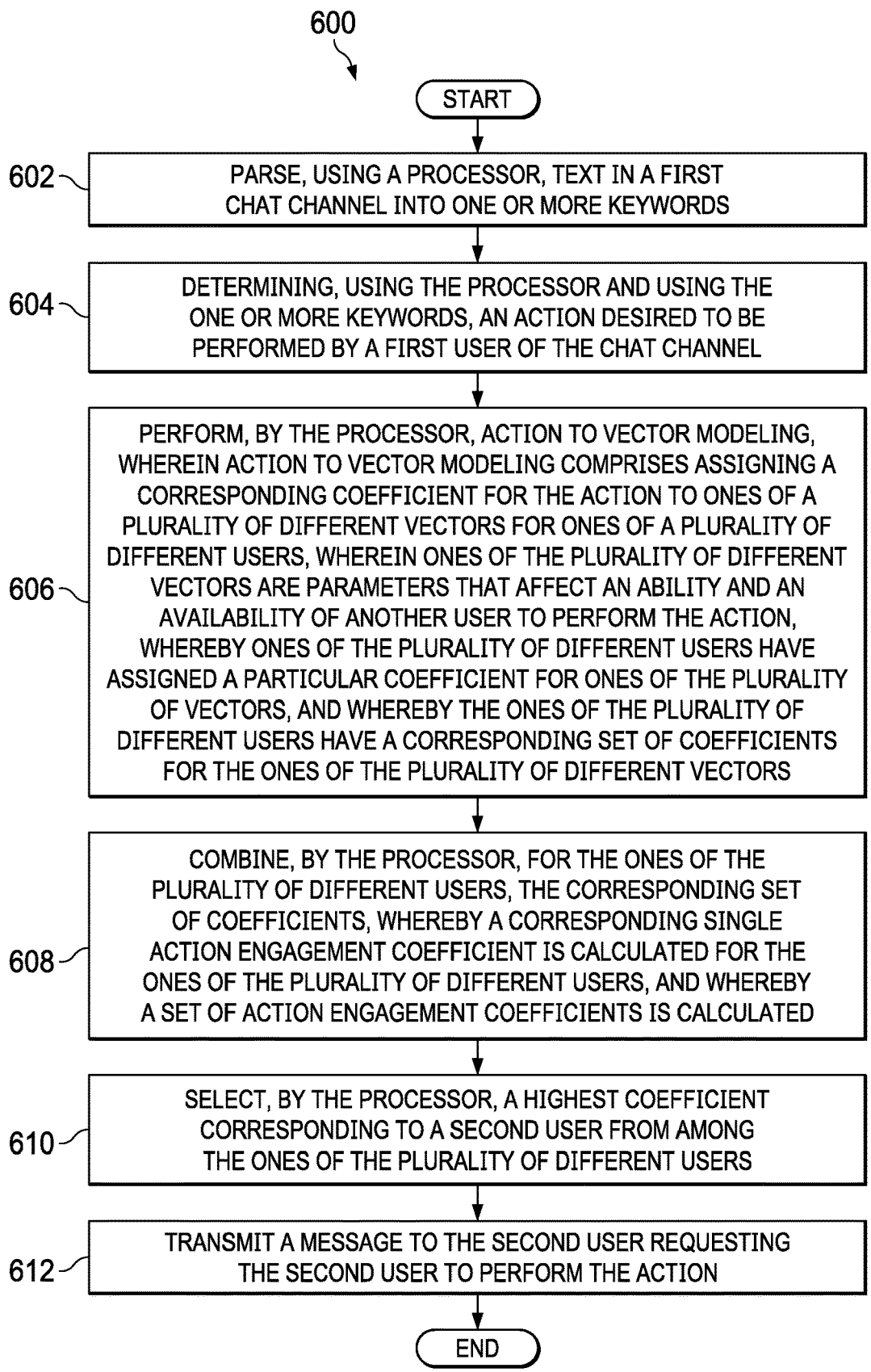
FIG. 6 illustrates a flowchart of a computer-implemented method of allocating, in real time, actions to individuals based on text monitored in chat channels executing on different computers in a computer network; in accordance with an illustrative embodiment.

FIG. 6 illustrates a flowchart of a computer-implemented method of allocating, in real time, actions to individuals based on text monitored in chat channels executing on different computers in a computer network. Method 600 may be implemented using a processor, such as server computer 108 of FIG. 1, processor 502 of FIG. 5, or data processing system 700 of FIG. 7. Method 600 is a variation of the methods described above with respect to FIG. 1 through FIG. 5. Method 600 may be characterized as a computer-implemented method of allocating, in real time, actions to individuals based on text monitored in chat channels executing on different computers in a computer network.

Method 600 includes parsing, using a processor, text in a first chat channel into one or more keywords (operation 602). Method 600 also includes determining, using the processor and using the one or more keywords, an action desired to be performed by a first user of the chat channel (operation 604).

Method 600 also includes performing, by the processor, action to vector modeling, wherein action to vector modeling comprises assigning a corresponding coefficient for the action to ones of a plurality of different vectors for ones of a plurality of different users, wherein ones of the plurality of different vectors are parameters that affect an ability and an availability of another user to perform the action, whereby ones of the plurality of different users have assigned a particular coefficient for ones of the plurality of vectors, and whereby the ones of the plurality of different users have a corresponding set of coefficients for the ones of the plurality of different vectors (operation 606) Method 600 also includes combining, by the processor, for the ones of the plurality of different users, the corresponding set of coefficients, whereby a corresponding single action engagement coefficient is calculated for the ones of the plurality of different users, and whereby a set of action engagement coefficients is calculated (operation 608).

Method 600 also includes selecting, by the processor, a highest coefficient corresponding to a second user from among the ones of the plurality of different users (operation 610). Method 600 also includes transmitting a message to the second user requesting the second user to perform the action (operation 612).

Method 600 may be varied. For example, combining may include multiplying the corresponding set of coefficients for the ones of the plurality of users. In another example, the plurality of different vectors include a skill category, a history of performing the action, a capability of performing the action, a proximate location for performing the action, and an environment in which a given user is involved.

In still another example, performing action to vector modeling further includes weighting a first coefficient for a first vector more than a second coefficient for a second vector. In yet another example, method 600 may also include displaying the plurality of vectors. In this case, method 600 may also include displaying sub-entries for each of the plurality of vectors, wherein the plurality of vectors and the sub-entries are displayed as a table of cells. Continuing this example, method 600 may also include, as part of performing action to vector modeling, selecting cells in the plurality of cells and assigning additional weighting to those vectors and sub-entries.

In yet another illustrative embodiment, method 600 may also include receiving by the processor feedback from a feedback mechanism. In this case, method 600 may also include revising, by the processor, the set of action engagement coefficients such that a revised highest coefficient is selected from a revised set of action engagement coefficients. In this case, either (a) the message is sent to the second user based on the revised highest coefficient or (b) a revised message based on the revised highest coefficient is sent to a third user requesting the third user perform the action.

In still another illustrative embodiment, receiving feedback comprises receiving the feedback from the second user. In this case, the feedback includes at least one of an additional vector relevant to the second user, a modification to an existing vector, or an indication of non-availability which sets an availability of the second user to zero.

Continuing this example, receiving feedback may be automatically receiving additional information from client computers belonging to the plurality of different users, and updating the highest coefficient in real time prior to the second user accepting assignment of the action. However, alternatively, when the message is a first message, when the revised message is sent to the third user, then method 600 may also include sending a new message to the second user requesting that the second user ignore the first message.

Many other illustrative embodiments are possible. Thus, the examples described with respect to FIG. 6 do not necessarily limit the claimed inventions.

Figure 7:
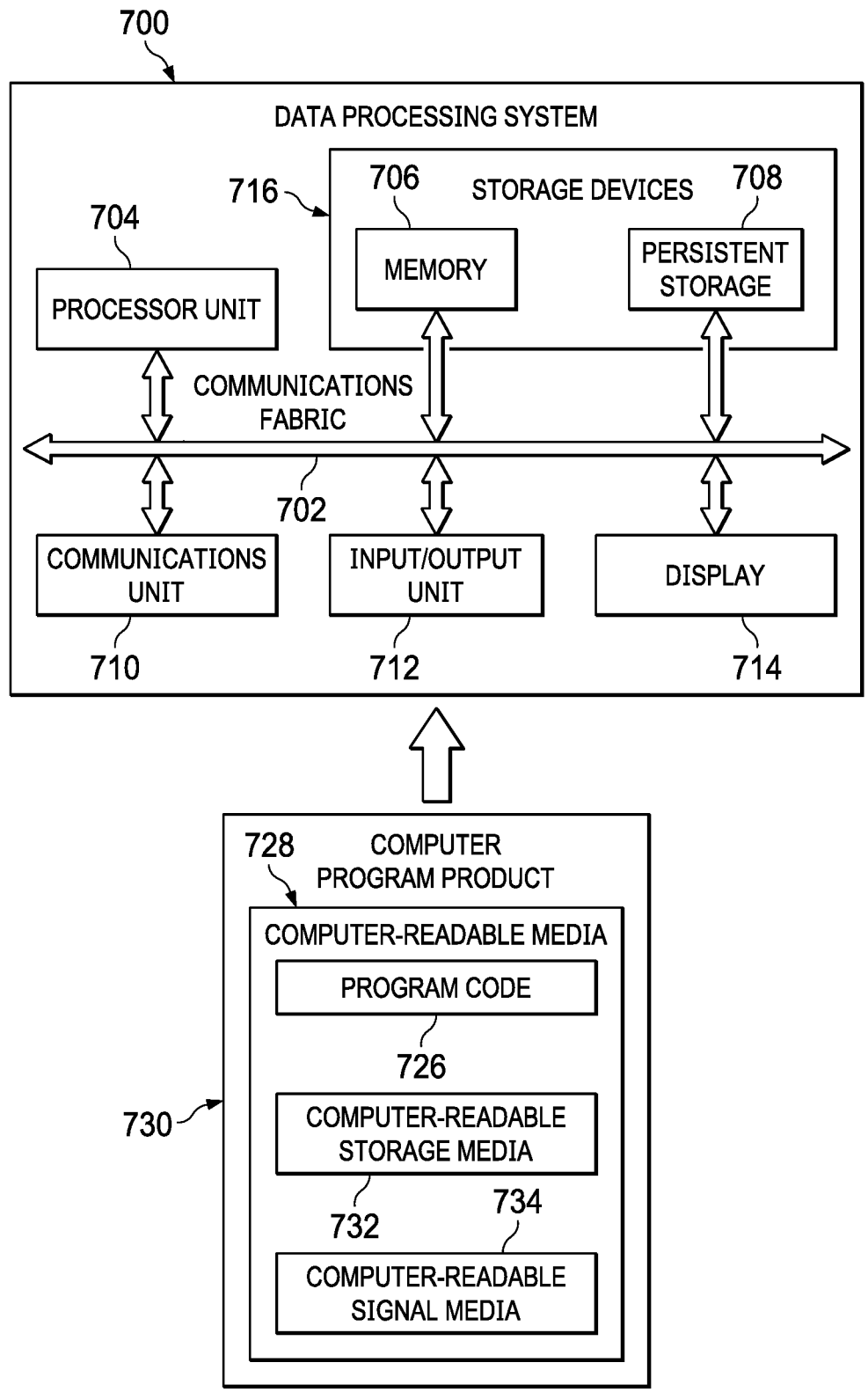
FIG. 7 illustrates a data processing system, in accordance with an illustrative embodiment.

With reference now to FIG. 7, a diagram of a data processing system is depicted in accordance with an illustrative embodiment. Data processing system 700 is an example of a computer, in which computer-readable program code or program instructions implementing processes of illustrative embodiments may be located. In this illustrative example, data processing system 700 includes communications fabric 702, which provides communications between processor unit 704, memory 706, persistent storage 708, communications unit 710, input/output unit 712, and display 714.

Processor unit 704 serves to execute instructions for software applications and programs that may be loaded into memory 706. Processor unit 704 may be a set of one or more hardware processor devices or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

Memory 706 and persistent storage 708 are examples of storage devices 716. A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 706, in these examples, may be, for example, a random access memory, or any other suitable volatile or non-volatile storage device. Persistent storage 708 may take various forms, depending on the particular implementation. For example, persistent storage 708 may contain one or more devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in this example, provides for communication with other computers, data processing systems, and devices via network communications unit 710 may provide communications using both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 700.

Input/output unit 712 allows for the input and output of data with other devices that may be connected to data processing system 700. For example, input/output unit 712 may provide a connection for user input through a keypad, keyboard, and/or some other suitable input device. Display 714 provides a mechanism to display information to a user and may include touch screen capabilities to allow the user to make on-screen selections through user interfaces or input data, for example.

Instructions for the operating system, applications, and/or programs may be located in storage devices 716, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented program instructions, which may be located in a memory, such as memory 706. These program instructions are referred to as program code, computer-usable program code, or computer-readable program code that may be read and run by a processor in processor unit 704. The program code, in the different embodiments, may be embodied on different physical computer-readable storage devices, such as memory 706 or persistent storage 708.

Program code 726 is located in a functional form on computer-readable media 728 that is selectively removable and may be loaded onto or transferred to data processing system 700 for running by processor unit 704. Program code 726 and computer-readable media 728 form computer program product 730. In one example, computer-readable media 728 may be computer-readable storage media 732 or computer-readable signal media 734. Computer-readable storage media 732 may include, for example, an optical or magnetic disc that is inserted or placed into a drive or other device that is part of persistent storage 708 for transfer onto a storage device, such as a hard drive, that is part of persistent storage 708. Computer-readable storage media 732 also may take the form of a persistent storage, such as a hard drive, a thumb drive, or a flash memory that is connected to data processing system 700. In some instances, computer-readable storage media 732 may not be removable from data processing system 700.

Alternatively, program code 726 may be transferred to data processing system 700 using computer-readable signal media 734. Computer-readable signal media 734 may be, for example, a propagated data signal containing program code 726. For example, computer-readable signal media 734 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 726 may be downloaded over a network to persistent storage 708 from another device or data processing system through computer-readable signal media 734 for use within data processing system 700. For instance, program code stored in a computer-readable storage media in a data processing system may be downloaded over a network from the data processing system to data processing system 700. The data processing system providing program code 726 may be a server computer, a client computer, or some other device capable of storing and transmitting program code 726.

The different components illustrated for data processing system 700 are not meant to provide architectural limitations to the manner in which different embodiments may be implemented. The different illustrative embodiments may be implemented in a data processing system including components in addition to, or in place of, those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a computer-readable storage device in data processing system 700 is any hardware apparatus that may store data. Memory 706, persistent storage 708, and computer-readable storage media 732 are examples of physical storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, illustrative embodiments of the present invention provide a computer implemented method, computer system, and computer program product for improving security on a computer system by identifying compromised or potentially compromised APIs using machine learning algorithms Optionally, only identified APIs may be subjected to static testing, as is known in the art.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of allocating, in real time, actions to individuals based on text monitored in chat channels executing on different computers in a computer network, the computer-implemented method comprising:

parsing, using a processor, the text in a first chat channel into one or more keywords;

determining, using the processor and using the one or more keywords, an action desired to be performed by a first user of the first chat channel;

performing, by the processor, action to vector modeling, wherein the action to vector modeling comprises assigning a corresponding coefficient for the action to ones of a plurality of different vectors for ones of a plurality of different users of the first chat channel, wherein ones of the plurality of different vectors are parameters that affect an ability and an availability of another user of the first chat channel to perform the action, whereby ones of the plurality of different users of the first chat channel have assigned a particular coefficient for ones of the plurality of different vectors, and whereby the ones of the plurality of different users of the first chat channel have a corresponding set of coefficients for the ones of the plurality of different vectors;

combining, by the processor, for the ones of the plurality of different users of the first chat channel, the corresponding set of coefficients, whereby a corresponding single action engagement coefficient is calculated for the ones of the plurality of different users of the first chat channel, and whereby a set of action engagement coefficients is calculated;

selecting, by the processor, a highest coefficient corresponding to a second user of the first chat channel from among the ones of the plurality of different users of the first chat channel; and transmitting a message to the second user of the first chat channel requesting the second user of the first chat channel to perform the action.

2. The computer-implemented method of claim 1, wherein combining comprises multiplying the corresponding set of coefficients for the ones of the plurality of users of the first chat channel.

3. The computer-implemented method of claim 1, wherein the plurality of different vectors include a skill category, a history of performing the action, a capability of performing the action, a proximate location for performing the action, and an environment in which a given user of the first chat channel is involved.

4. The computer-implemented method of claim 1, wherein performing the action to vector modeling further comprises:

weighting a first coefficient for a first vector of the plurality of different vectors which are parameters that affect the ability and the availability of the another user of the first chat channel to perform the action more than a second coefficient for a second vector of the plurality of different vectors which are parameters that affect the ability and the availability of the another user of the first chat channel to perform the action.

5. The computer-implemented method of claim 1 further comprising:

displaying the plurality of different vectors of the plurality of different users of the first chat channel.

6. The computer-implemented method of claim 5 further comprising:

displaying sub-entries for each of the plurality of different vectors, wherein the plurality of different vectors and the sub-entries are displayed as a table of cells.

7. The computer-implemented method of claim 6 further comprising:

as part of performing the action to vector modeling, selecting cells in the table of cells and assigning additional weighting to those vectors and their associated sub-entries.

8. The computer-implemented method 1 further comprising:

receiving, by the processor, feedback from a feedback mechanism; and revising, by the processor, the set of action engagement coefficients such that a revised highest coefficient is selected from a revised set of action engagement coefficients, and wherein either (a) a message is sent to the second user of the first chat channel based on the revised highest coefficient or (b) a revised message based on the revised highest coefficient is sent to a third user of the first chat channel requesting the third user of the first chat channel to perform the action.

9. The computer-implemented method of claim 8, wherein receiving the feedback comprises receiving the feedback from the second user of the first chat channel, and wherein the feedback includes at least one of an additional vector relevant to the second user of the first chat channel, a modification to an existing vector, or an indication of non-availability which sets an availability of the second user of the first chat channel to zero.

10. The computer-implemented method of claim 8, wherein receiving the feedback comprises automatically receiving additional information from client computers belonging to the plurality of different users of the first chat channel, and updating the highest coefficient in real time prior to the second user of the first chat channel accepting assignment of the action.

11. The computer-implemented method of claim 8, wherein the message is a first message, wherein the revised message is sent to the third user of the first chat channel, and wherein the computer-implemented method further comprises:

sending a new message to the second user of the first chat channel requesting that the second user of the first chat channel ignore the first message.

12. A computer comprising:

a processor; and non-transitory computer-readable storage medium storing program code, which when executed by the processor, performs a computer-implemented method of allocating, in real time, actions to individuals based on text monitored in chat channels executing on different computers in a computer network, the program code for implementing the computer-implemented method comprising:

computer-usable program code for parsing, using a processor, the text in a first chat channel into one or more keywords;

computer-usable program code for determining, using the processor and using the one or more keywords, an action desired to be performed by a first user of the first chat channel;

computer-usable program code for performing, by the processor, action to vector modeling, wherein the action to vector modeling comprises assigning a corresponding coefficient for the action to ones of a plurality of different vectors for ones of a plurality of different users of the first chat channel, wherein ones of the plurality of different vectors are parameters that affect an ability and an availability of another user of the first chat channel to perform the action, whereby ones of the plurality of different users of the first chat channel have assigned a particular coefficient for ones of the plurality of vectors, and whereby the ones of the plurality of different users of the first chat channel have a corresponding set of coefficients for the ones of the plurality of different vectors;

computer-usable program code for combining, by the processor, for the ones of the plurality of different users of the first chat channel, the corresponding set of coefficients, whereby a corresponding single action engagement coefficient is calculated for the ones of the plurality of different users of the first chat channel, and whereby a set of action engagement coefficients is calculated;

computer-usable program code for selecting, by the processor, a highest coefficient corresponding to a second user of the first chat channel from among the ones of the plurality of different users of the first chat channel; and computer-usable program code for transmitting a message to the second user of the first chat channel requesting the second user of the first chat channel to perform the action.

13. The computer of claim 12, wherein the computer-usable program code for combining comprises computer-usable program code for multiplying the corresponding set of coefficients for the ones of the plurality of users of the first chat channel.

14. The computer of claim 12, wherein the plurality of different vectors include a skill category, a history of performing the action, a capability of performing the action, a proximate location for performing the action, and an environment in which a given user of the first chat channel is involved.

15. The computer of claim 12, wherein the computer-usable program code for performing the action to vector modeling further comprises:

computer-usable program code for weighting a first coefficient for a first vector of the plurality of different vectors which are parameters that affect the ability and the availability of the another user of the first chat channel to perform the action more than a second coefficient for a second vector of the plurality of different vectors which are parameters that affect the ability and the availability of the another user of the first chat channel to perform the action.

16. The computer of claim 12, wherein the computer-usable program code further comprises:

computer-usable program code for displaying the plurality of different vectors of the plurality of different users of the first chat channel;

computer-usable program code for displaying sub-entries for each of the plurality of different vectors, wherein the plurality of different vectors and the sub-entries are displayed as a table of cells; and computer-usable program code for as part of performing the action to vector modeling, selecting cells in the table of cells and assigning additional weighting to those vectors and their associated sub-entries.

17. The computer of claim 12, wherein the computer-usable program code further comprises:

computer-usable program code for receiving, by the processor, feedback from a feedback mechanism; and computer-usable program code for revising, by the processor, the set of action engagement coefficients such that a revised highest coefficient is selected from a revised set of action engagement coefficients, and wherein either (a) a message is sent to the second user of the first chat channel based on the revised highest coefficient or (b) a revised message based on the revised highest coefficient is sent to a third user of the first chat channel requesting the third user of the first chat channel to perform the action.

18. The computer of claim 17, wherein the computer-usable program code for receiving the feedback comprises one of:

computer-usable program code for receiving the feedback from the second user of the first chat channel, and wherein the feedback includes at least one of an additional vector relevant to the second user of the first chat channel, a modification to an existing vector, or an indication of nonavailability which sets an availability of the second user of the first chat channel to zero; and computer-usable program code for automatically receiving additional information from client computers belonging to the plurality of different users of the first chat channel, and updating the highest coefficient in real time prior to the second user of the first chat channel accepting assignment of the action.

19. The computer of claim 17, wherein the message is a first message, wherein the revised message is sent to the third user of the first chat channel, and wherein the computer-usable program code further comprises:

computer-usable program code for sending a new message to the second user of the first chat channel requesting that the second user of the first chat channel ignore the first message.

20. A non-transitory computer-readable storage medium storing program code, which when executed by a processor, performs a computer-implemented method of allocating, in real time, actions to individuals based on text monitored in chat channels executing on different computers in a computer network, the program code for implementing the computer-implemented method comprising:

computer-usable program code for parsing, using the processor, the text in a first chat channel into one or more keywords;

computer-usable program code for determining, using the processor and using the one or more keywords, an action desired to be performed by a first user of the first chat channel;

computer-usable program code for performing, by the processor, action to vector modeling, wherein the action to vector modeling comprises assigning a corresponding coefficient for the action to ones of a plurality of different vectors for ones of a plurality of different users of the first chat channel, wherein ones of the plurality of different vectors are parameters that affect an ability and an availability of another user of the first chat channel to perform the action, whereby ones of the plurality of different users of the first chat channel have assigned a particular coefficient for ones of the plurality of vectors, and whereby the ones of the plurality of different users of the first chat channel have a corresponding set of coefficients for the ones of the plurality of different vectors;

computer-usable program code for combining, by the processor, for the ones of the plurality of different users of the first chat channel, the corresponding set of coefficients, whereby a corresponding single action engagement coefficient is calculated for the ones of the plurality of different users of the first chat channel, and whereby a set of action engagement coefficients is calculated;

computer-usable program code for selecting, by the processor, a highest coefficient corresponding to a second user of the first chat channel from among the ones of the plurality of different users of the first chat channel; and computer-usable program code for transmitting a message to the second user of the first chat channel requesting the second user of the first chat channel to perform the action.

\* \* \* \* \*